United States Patent
Nater et al.

(10) Patent No.: US 10,878,245 B2
(45) Date of Patent: Dec. 29, 2020

(54) VIDEO CONTENT ACTIVITY REGIONS

(71) Applicant: Logitech Europe S.A., Lausanne (CH)

(72) Inventors: Fabian Nater, Zurich (CH); Gaurav Bradoo, San Francisco, CA (US); Rahim Ka, Fremont, CA (US); Tingshan Gou, Newark, CA (US)

(73) Assignee: Logitech Europe S.A., Lausanne (CH)

( * ) Notice: Subject to any disclaimer, the term of this patent is extended or adjusted under 35 U.S.C. 154(b) by 125 days.

(21) Appl. No.: 15/993,234

(22) Filed: May 30, 2018

(65) Prior Publication Data
US 2019/0370552 A1    Dec. 5, 2019

(51) Int. Cl.
  *G06K 9/00*  (2006.01)
  *G06T 7/246*  (2017.01)
  *G06K 9/32*  (2006.01)

(52) U.S. Cl.
  CPC ....... *G06K 9/00718* (2013.01); *G06K 9/3233* (2013.01); *G06T 7/248* (2017.01); *G06K 9/00288* (2013.01); *G06T 2207/10016* (2013.01); *G06T 2207/30201* (2013.01); *G06T 2207/30232* (2013.01)

(58) Field of Classification Search
  CPC ............ G06K 9/00718; G06K 9/3233; G06K 9/00288; G06T 7/248; G06T 2207/10016; G06T 2207/30201; G06T 2207/30232
  See application file for complete search history.

(56) References Cited

U.S. PATENT DOCUMENTS

| | | | |
|---|---|---|---|
| 2008/0080789 A1* | 4/2008 | Marks | A63F 13/06 382/296 |
| 2014/0307946 A1* | 10/2014 | Nakahira | G03F 7/7065 382/149 |
| 2017/0125064 A1* | 5/2017 | Aggarwal | H04N 5/23296 |
| 2018/0113577 A1* | 4/2018 | Burns | G06F 3/04817 |
| 2018/0115788 A1* | 4/2018 | Burns | G06K 9/00771 |
| 2018/0232592 A1* | 8/2018 | Stewart | G08B 13/19606 |
| 2019/0141919 A1* | 5/2019 | Kundra | G06K 9/00765 348/159 |

* cited by examiner

*Primary Examiner* — Khai M Nguyen
(74) *Attorney, Agent, or Firm* — Kilpatrick Townsend & Stockton LLP

(57) ABSTRACT

A method for determining and recommending video content activity regions of a scene in a recorded video includes: extracting an image of a scene from a video; performing static analysis of the extracted image; detecting motion in the scene based on motion detection signals received from one or more devices configured to detect motion; performing motion analysis on the video and the motion detection signals; and based on results of the static analysis and the motion analysis, recommending via a user interface displayed on a display device a zone of interest within the scene.

31 Claims, 8 Drawing Sheets

VIDEO CONTENT ACTIVITY REGIONS

BACKGROUND

Unless otherwise indicated herein, the materials described in this section are not prior art to the claims in this application and are not admitted to be prior art by inclusion in this section.

Conventional video camera systems communicate with computers. Software running on the computer provide a user with various functionality related to the video images communicated from the video camera to the computer. For example, the computer can process video images captured by the camera to determine whether motion occurs in the captured images. A user interface enables a user to manually define regions of a video scene captured by the video camera that are of specific interest to the user and to set notifications for the defined regions. Manually defining regions of interest can be tedious and prone to errors in identifying regions where activity occurs.

SUMMARY

Systems and methods for determining and recommending video content activity regions of a scene in a recorded video are provided.

According to various aspects there is provided a system for determining and recommending video content activity regions of a scene in a recorded video. In some aspects, the system may include: a video camera; a display device configured to display a user interface; a computer coupled with the video camera and the display device. The computer may be configured to: extract an image of a scene from a video; perform static analysis of the extracted image; detect motion in the scene based on motion detection signals received from one or more devices configured to detect motion; perform motion analysis on the video and the motion detection signals; and based on results of the static analysis and the motion analysis, recommend via the user interface a zone of interest within the scene.

The computer may generate an interest recommendation indicating a reason that a recommended zone is of interest based on results of the static analysis and the motion analysis, and may modify the interest recommendation based on input to the user interface, and cause the modified interest recommendation to be considered in future static analysis and motion analysis.

The computer may correlate the motion detection signals with motion analysis of the video, and based at least in part on the correlation determine a location of movement. The computer may generate an action recommendation indicating an action to be taken for a recommended zone of interest based on results of the static analysis and the motion analysis, and may modify the action recommendation based on input to the user interface, and cause the modified interest recommendation to be considered in future static analysis and motion analysis.

The computer may determine that a recommended zone of interest has a high level of detected motion compared to a specified detected motion threshold, and may generate an action recommendation to not provide notification of motion in the recommended zone when motion analysis results indicate that the recommended zone of interest has a high level of detected motion and static analysis results indicate that the motion is caused by a static object.

The computer may generate an action recommendation to provide notification of motion when motion analysis results indicate that a recommended zone of interest has a high level of detected motion and static analysis results indicate that the motion is caused by a person.

The computer may perform static analysis including performing video recognition of static objects in the extracted image; labeling recognized static objects with tags; and assigning confidence level values to the tags indicating a degree of confidence in recognition of the static objects.

The computer may perform motion analysis including determining a maximum detected motion level in a region; identifying regions around the region containing the maximum detected motion level that have detected motion levels equal to or greater than a specified detected motion level threshold lower than the maximum detected motion level; and determining a region of interest as a region combining the maximum detected motion level and the identified regions having detected motion levels equal to or greater than the specified detected motion level threshold.

The computer may perform motion analysis also including determining a minimum detected motion level in a region; identifying regions around the region containing the minimum detected motion level that have detected motion levels equal to or less than a specified minimum detected motion level threshold greater than the minimum detected motion level threshold; and determining a region of interest as a region combining the maximum detected motion level and the identified regions having detected motion levels equal to or greater than the specified detected motion level threshold.

The motion analysis performed by the computer may include filtering the results of the motion analysis based on a scene measurement; and recommending an action based on the filtered results of the motion analysis. The scene measurement may include facial recognition and/or object recognition and/or detection of motion inconsistent with general motion detected in the zone.

The computer may generate a rule for the zone of interest specifying an action to be taken when an event occurs, and cause the rule to be recommended via the user interface.

According to various aspects there is provided a method for determining and recommending video content activity regions of a scene in a recorded video. In some aspects, the method may include: extracting an image of a scene from a video; performing static analysis of the extracted image; detecting motion in the scene based on motion detection signals received from one or more devices configured to detect motion; performing motion analysis on the video and the motion detection signals; and based on results of the static analysis and the motion analysis, recommending via a user interface displayed on a display device a zone of interest within the scene.

The method may further include correlating the motion detection signals with motion analysis of the video, and based at least in part on the correlation determining a location of movement.

The method may further include generating an interest recommendation indicating a reason that a recommended zone is of interest based on results of the static analysis and the motion analysis, and modifying the interest recommendation based on input to the user interface, and causing the modified interest recommendation to be considered in future static analysis and motion analysis.

The method may further include generating an action recommendation indicating an action to be taken for a recommended zone of interest based on results of the static analysis and the motion analysis, and modifying the action recommendation based on input to the user interface; and causing the modified action recommendation to be considered in future static analysis and motion analysis.

The method may further include determining a recommended zone of interest has a high level of detected motion compared to a specified detected motion threshold and generating an action recommendation to not provide notification of motion in the recommended zone when motion analysis results indicate that the recommended zone of interest has a high level of detected motion and static analysis results indicate that the motion is caused by a static object.

The method may further include generating an action recommendation to provide notification of motion when motion analysis results indicate that a recommended zone of interest has a high level of detected motion and static analysis results indicate that the motion is caused by a person.

The static analysis performed by the method may include performing video recognition of static objects in the extracted image; labeling recognized static objects with tags; and assigning confidence level values to the tags indicating a degree of confidence in recognition of the static objects.

The motion analysis performed by the method may include determining a maximum detected motion level in a region; identifying regions around the region containing the maximum detected motion level that have detected motion levels equal to or greater than a specified detected motion level threshold lower than the maximum detected motion level; and determining a region of interest as a region combining the maximum detected motion level and the identified regions having detected motion levels equal to or greater than the specified detected motion level threshold.

The motion analysis performed by the method may further include determining a minimum detected motion level in a region; identifying regions around the region containing the minimum detected motion level that have detected motion levels equal to or less than a specified minimum detected motion level threshold greater than the minimum detected motion level threshold; and determining a region of interest as a region combining the maximum detected motion level and the identified regions having detected motion levels equal to or greater than the specified detected motion level threshold.

The motion analysis performed by the method may include filtering the results of the motion analysis based on a scene measurement; and recommending an action based on the filtered results of the motion analysis. The scene measurement may include facial recognition and/or object recognition and/or detection of motion inconsistent with general motion detected in the zone.

The method may further include generating a rule for the zone of interest specifying an action to be taken when an event occurs, and causing the rule to be recommended via the user interface.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

A user may view on a monitor a video scene captured by a camera and using an on-screen editor manually define areas in which motion may be detected. The user may elect to be notified of motion events detected in the defined areas or may elect to ignore motion events in the defined areas. For example, a camera may be placed in a room that a user wants to monitor. The room may have window. The user may expect activity in some portions of the room, for example around a file cabinet or bookcase, but may not expect activity in another portion of the room, for example around a safe. The user may view the room scene captured by the camera and may manually define areas of the room in which motion may be detected. For example, the user may manually define an area of the room including the file cabinet or bookcase as an area in which motion may be detected and may elect to be notified of any motion events in the defined area or may elect to ignore motion events in that area and not receive notifications.

Similarly, the user may manually define an area of the room including the safe as an area in which motion may be detected. The user may not expect activity around the safe and may elect to receive notifications of any motion events occurring in that defined area. The window in the room may face a busy street and each passing car may trigger a motion event that will be detected by the camera and notified to the user. The user may determine that motion outside the window is not of interest. In order to avoid a high number of irrelevant motion notifications, the user may manually define an area around the window and may elect to ignore motion detected in that area.

In each case, the user must make a determination as to which portions of the room are likely to have various levels of activity, manually define those areas, and select a response, i.e., notify or ignore, to motion events detected in those areas.

In accordance with various aspects of the present disclosure, systems and methods for determining and recommending video content activity regions and establishing responses to detected activity in the regions are provided.

Figure 1:
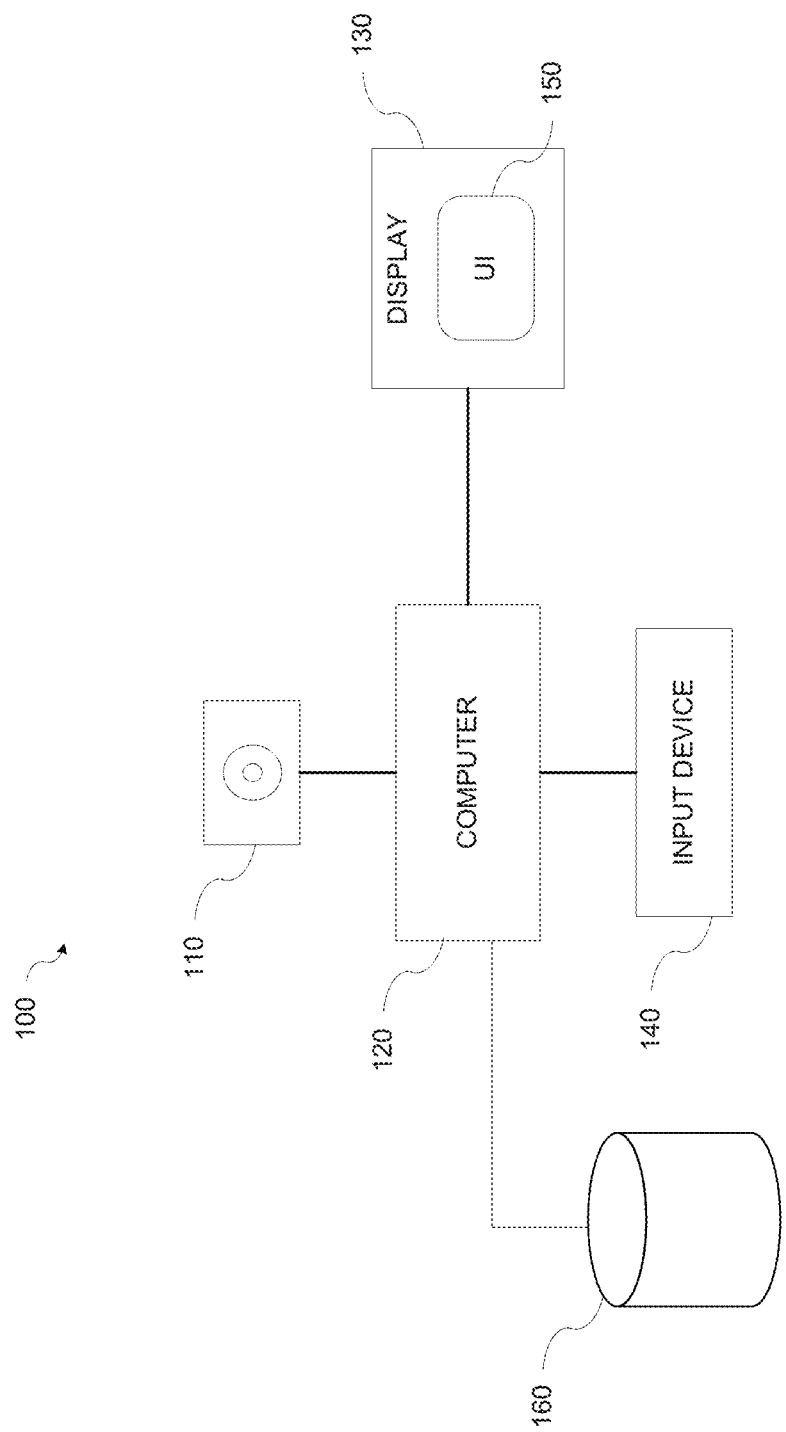
FIG. 1 is a block diagram of a video camera system in accordance with various aspects of the present disclosure.

FIG. 1 is a block diagram of a video camera system 100 in accordance with various aspects of the present disclosure. Referring to FIG. 1, the video camera system 100 may include a video camera 110, a computer 120, a display device 130, an input device 140, and a storage device 160. The computer 120 may be, for example but not limited to, a computer, processor, microprocessor, controller, microcontroller, server, etc., and may communicate with the video camera 110 to receive video images. The computer 120 may also communicate with the storage device 160 to store video data of the video captured by the video camera 110 as well as video data processed by the computer 120. The storage device 160 may be, for example but not limited to, a hard disk drive, a solid-state drive, or other storage capable of storing the recorded video data.

The computer 120 may also communicate with the display device 130 to render the video images received from the video camera 110 and display a user interface 150. The user interface 150 may include a graphical editor that enables a user to interact with the video images via the input device 140. In accordance with various aspects of the present disclosure the user interface 150 may be a web application. The input device 140 may be for example but not limited to a keyboard and/or mouse. One of ordinary skill in the art will appreciate that other input devices may be used without departing from the scope of the present disclosure.

In accordance with various aspects of the present disclosure, the video camera 110 may be fixed on a scene. Alternatively, the video camera 110 may move (e.g., pan, tilt, zoom). In such cases where the video camera 110 moves, the relative position of the video camera 110 may be tracked and the movement correlated to the features of the scene. In cases of uncontrolled or unintentional camera movement (e.g., camera tampering, faulty mounting, etc.), the computer 120 may determine based on previously recorded video whether the field of view of the video camera 110 has changed. The computer 120 may detect and compensate for the uncontrolled or unintentional camera movement when providing recommendations. For example, the computer 120 may determine whether sufficient measurements of actual motion of objects in the scene that are not disturbed by the motion of the camera are available for analysis in order to suggest a zone to monitor and/or an action for that zone.

When the computer 120 determines that sufficient measurements are not available for analysis, the computer 120 may determine not to generate action suggestions and/or notifications for the affected zones. Alternatively or additionally, the computer 120 may suggest an action to check the position and/or condition of the video camera 110.

The computer 120 of the video camera system 100 may analyze a recorded video of a monitored space and provide recommendations to the user of areas, or zones, within the space in which motion events may be detected, the level of motion within the zones (i.e., whether a high or low number of motion events may be expected), and whether to be notified of the motion events or ignore the motion events in the zones. The video camera system 100 may generate motion metadata used to determine frequent motion, rare or no motion, or motion that appears and/or disappears.

Based at least in part on a characterization of the space to be monitored and the motion metadata, the computer 120 of the video camera system 100 may generate recommended zones within the space to be monitored for motion events as well as recommend a system response to a detected motion event (e.g., notify or ignore), for example, via the user interface 150. Once the specified system responses are established, various methods of notifying a user, for example but not limited to, via the user interface, wearable device, etc., or with audio cues via, for example but not limited to Amazon Echo, Siri, etc., that the system has responded to an event may be provided.

The computer 120 of the video camera system 100 may recommend special interest zones, for example but not limited to where a car is parked, a lawn in in a front yard or backyard, etc. The computer 120 of the video camera system 100 may recommend zones to ignore, for example but not limited to a television, couch, a street, etc. Further, the computer 120 of the video camera system 100 may invoke a "privacy advisor" to recommend privacy zones that should be masked from the public. For example, in some countries legal regulations prohibit a private user from filming a public street. The computer 120 of the video camera system 100 may automatically advise of the prohibition and generate a recommendation to ignore a zone including a public street. As another example, if a zone including a bathroom entrance or even a couch region is detected, the computer 120 may suggest to ignore the zone. Alternatively, rather than notifying or not notifying about motion occurring in a privacy zone, the computer 120 of the video camera system 100 may ignore all motion happening in a certain area or blur/mask the area. One of ordinary skill in the art will appreciate that other types of zones may be recommended without departing from the scope of the present disclosure.

A video camera in a video camera system may monitor a scene such as a room, a yard, a parking lot, etc. The scene monitored by the video camera will typically include various static features, for example, but not limited to, doors, windows, furniture, electronic equipment, etc. One of ordinary skill in the art will appreciate that this is not an exhaustive list and that many other types of static features may be included in a scene monitored by the video camera.

In accordance with various aspects of the present disclosure, the video camera system 100 may identify various static features included in a scene monitored by the video camera 110. One or more images (e.g., still frames) having no motion activity may be extracted from a video of the scene. The video may be prerecorded or may be captured in real time. For example, the computer 120 may analyze the video, identify an image of the monitored scene, and extract the identified image.

Figure 2:
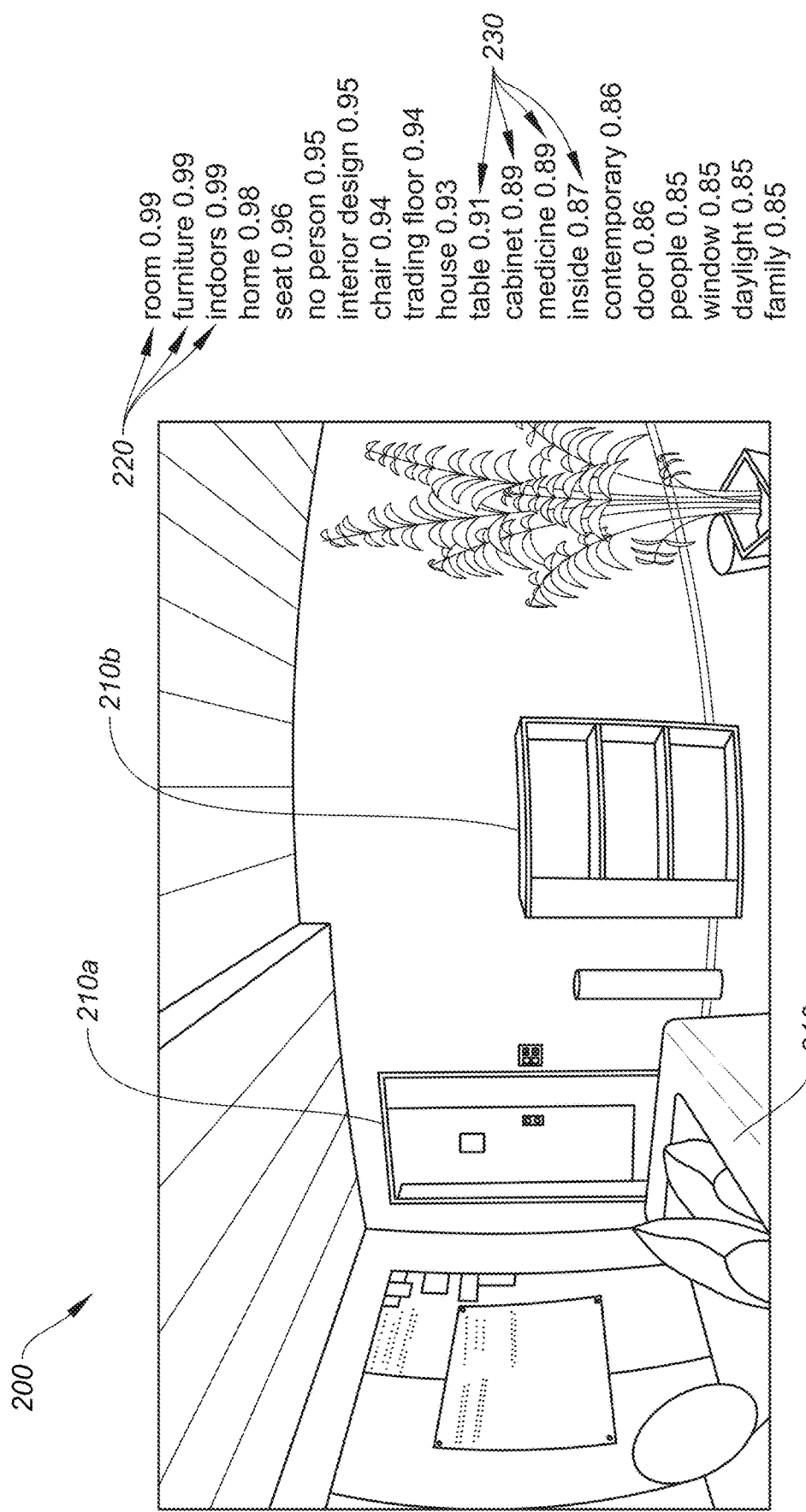
FIG. 2 is an illustration of a still frame of a video representing a scene monitored by a video camera in accordance with various aspects of the present disclosure.

The video camera system 100 may analyze the extracted image(s) (i.e., perform a static scene analysis) to identify various static objects in the scene. For example, the computer 120 may analyze the extracted image(s) and perform video recognition of the various static objects in the scene. FIG. 2 is an illustration of an image of a video representing a scene 200 monitored by a video camera 110 in accordance with various aspects of the present disclosure.

Referring to FIG. 2, the computer 120 may analyze the extracted image(s) and may label recognized static objects 210a, 210b, 210c in the scene 200 with tags 220 (e.g., "door," "cabinet," "chair," etc.) and assign confidence level values 230 to the tags 220 indicating a degree of confidence in the recognition of the static object. Alternatively, the video recognition, tagging, and confidence level value assignment for the static objects in the extracted still image(s) may be performed external to the video camera system 100 and the resulting data may be input to the system. In accordance with various aspects of the present disclosure, the tags 220 and confidence level values 230 may subsequently be used at least in part to form recommendations to the user regarding various zones of interest in the scene and responses to activity detected in various zones.

The video camera system 100 may analyze the video to determine areas, or zones, within the scene where motion occurs (i.e., perform a motion analysis). For example, the computer 120 may analyze the video using a motion detection algorithm to identify motion in the scene and identify, or "tag," the areas where the motion is detected as well as indicating a level of motion (e.g., high, low, etc.) and time stamping the point in the video when the motion is detected. In accordance with various aspects of the present disclosure, the tagged areas of motion, the indicated level of motion, and the time stamp of the motion may subsequently be used at least in part to form recommendations to the user regarding various zones of interest in the scene and responses to motion detected in various zones.

Figure 3:
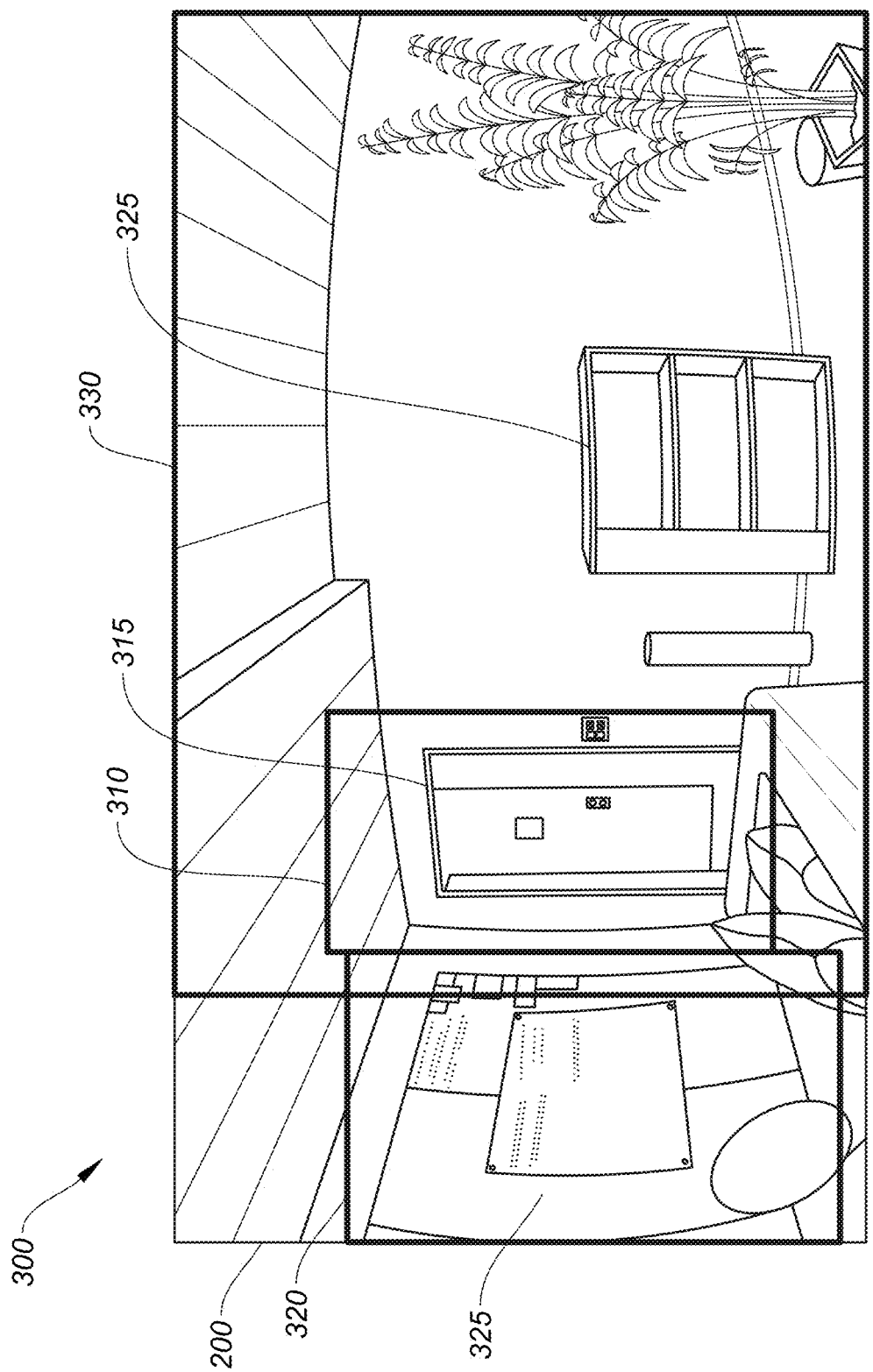
FIG. 3 is an illustration of possible zones in the scene in which motion may be detected in accordance with various aspects of the present disclosure.

FIG. 3 is an illustration 300 of possible zones in the scene 200 in which motion may be detected in accordance with various aspects of the present disclosure. Referring to FIG. 3, a first zone 310 in which motion may be detected in the scene 200 may be around a doorway 315. People may pass by or through this doorway 315 resulting in high levels of detected motion at various times. People passing by the doorway 315, may result in only brief detection of motion in the first zone 310 as opposed to motion detected when people enter the room through the doorway.

A second zone 320 in which motion may be detected in the scene 200 may be near a white board 325. At times, a person may enter the room to look at something on the white board 325 resulting in some lower detected motion in the second zone 320 than in the first zone 310. A third zone 330 in which motion may be detected in the scene 200 may be around a cabinet 325 and may also include the doorway 315. People may enter the doorway 315 to access the cabinet 325 resulting in high levels of detected motion at various times.

One of ordinary skill in the art will appreciate that the identified zones are merely exemplary and that different zones, more zones, or less zones may be identified without departing from the scope of the present disclosure.

While the above examples are described with respect to detected motion resulting from people entering and/or leaving a room, motion caused by other than people moving in a zone may be detected. For example, when monitoring a room in a home, motion may be detected when a pet enters the room. If monitoring an outdoor scene, for example, a yard or a parking lot, motion of foliage moving in a breeze may be detected. One of ordinary skill in the art will appreciate that motion other than motion caused by moving people may be detected without departing from the scope of the present disclosure.

In accordance with various aspects of the present disclosure, movement may be detected by various devices or sensors configured to detect motion. The computer 120 may be coupled to the one or more devices or sensors, for example but not limited to, an ultrasonic rangefinder/imager, an infrared (IR) detector, a trip laser, etc., and receive motion detection signals from the one or more devices or sensors. One of ordinary skill in the art will appreciate that other devices or sensors may be used without departing from the scope of the present disclosure.

The computer 120 may determine a location of movement detected by the one or more devices or sensors as a respective location of a zone within an image. The video camera 110 may capture an image of the location of the movement. The computer 120 may correlate the motion detection signals with the motion analysis of the video and based at least in part on this correlation determine a location of movement in a scene or zone. By determining the location of the movement and capturing an image of the location of the movement, the computer 120 may suggest a zone of interest based on the characteristics of the detected movement.

In accordance with various aspects of the present disclosure, the video camera system 100 may recommend to the user via the user interface 150 one or more zones of a video scene in which motion should be monitored defined by the video camera system 100, establish a reason why a defined zone may be of interest to the user, and recommend what the user should do with the information based on the zone and what is happening in the zone.

The computer 120 may generate various rules for the zone and cause the various rules to be recommended. For example, a rule may be recommended such that when an object enters a zone, an alert is sent to the user. The alert may be, for example but not limited to, siren, bell, phone-call, etc. The rule may be generated based on object recognition and/or contextual information (e.g., time of day, location, weather, etc.). Historical values may be determined over time to determine a pattern. Alternatively or additionally, crowd-sourced information (e.g., traffic, events, etc.) may be used.

Each rule may include prerequisites that lead to an action to be taken in response to the rule. The action may be recommended to a user or the user may select an action, for example but not limited to, from a list of actions generated by the computer 120 and displayed on the user interface 150. Actions that may be taken may be, for example but not limited to, generating a specific alert, opening a gate, turning on lights, turning on a Roomba or other appliance, sending out a drone, etc. One of ordinary skill in the art will appreciate that the listed actions are merely exemplary and that other actions may be taken in response to various rules without departing from the stop of the present disclosure. Rules and/or actions may overlap in various combinations.

Figure 4A:
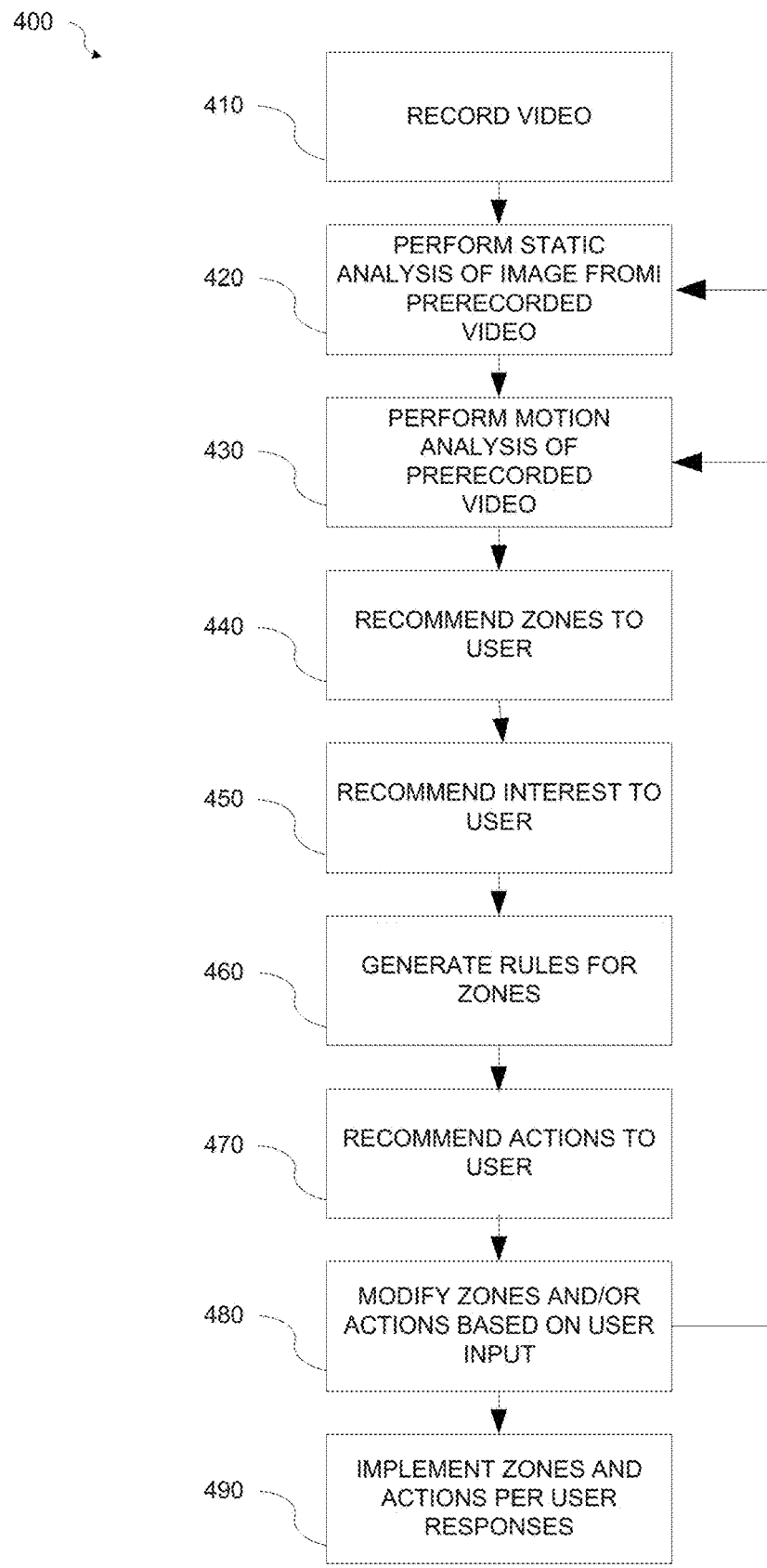
FIG. 4A is a flowchart of a method for determining and recommending video content activity regions in accordance with various aspects of the present disclosure.

FIG. 4A is a flowchart of a method 400 for determining and recommending video content activity regions in accordance with various aspects of the present disclosure. Referring to FIG. 4, at bock 410, the video camera system 100 may record video of a space to be monitored for a period of time. For example, the video camera 110 may be placed in a location to monitor a scene (e.g., a room, a yard, etc.) and the video camera system 100 may record video of the scene for a period of time, for example but not limited to 24 hours or another longer or shorter time period. The computer 120 may cause video data of the recorded video to be stored in the storage 160.

Figure 4B:
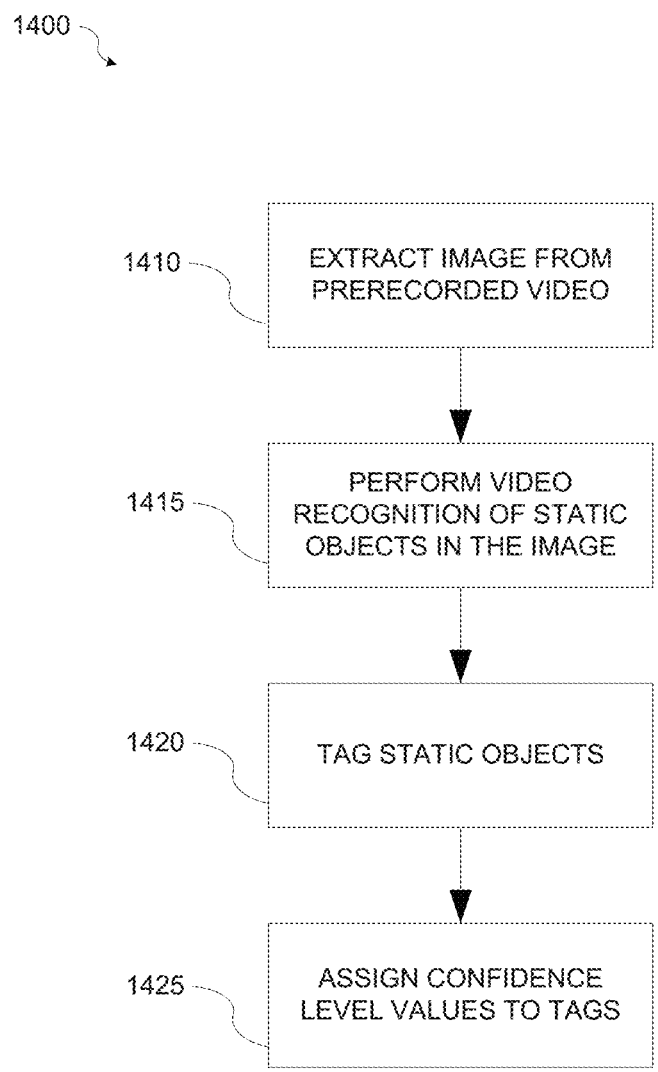
FIG. 4B is a flowchart of a method for performing a static analysis of an image of a video in accordance with various aspects of the present disclosure.

At block 420, a static scene analysis may be performed. The computer 120 may analyze one or more still frames of the video using a scene analysis tool. The video may be prerecorded or may be captured in real time. FIG. 4B is a flowchart of a method 1400 for performing a static analysis of an image of the video in accordance various aspects of the present disclosure. Referring to FIG. 4B, the computer 120 may analyze the video and extract one or more still images having no motion activity. The computer 120 may analyze the extracted still image(s) and perform video recognition of the various static objects in the image. For example, the computer 120 may run a semantic scene interpretation algorithm/tool that returns attributes (e.g., outdoor/indoor, garage, parking, front yard, grass, garden, driveway, street, door, window, pet-bed, living room, couch, coffee machine, etc.), from the image. Additionally, the algorithm/tool may return possible regions of the image associated with the attributes.

The computer 120 may label recognized static objects in the scene with tags and assign confidence level values to the tags indicating a degree of confidence in the recognition of the static object. For example, the computer 120 may match the attributes with the regions of the image. Alternatively, the computer 120 may crop portions from the still image(s), for example based on a previous motion analysis or user selection, and the static analysis may be performed on the cropped portions of the still image(s). Alternatively, the video recognition, tagging, and confidence level value assignment for the static objects in the extracted still image(s) or crops of the still image(s) may be performed external to the video camera system 100 and the resulting data may be input to the system.

Figure 4C:
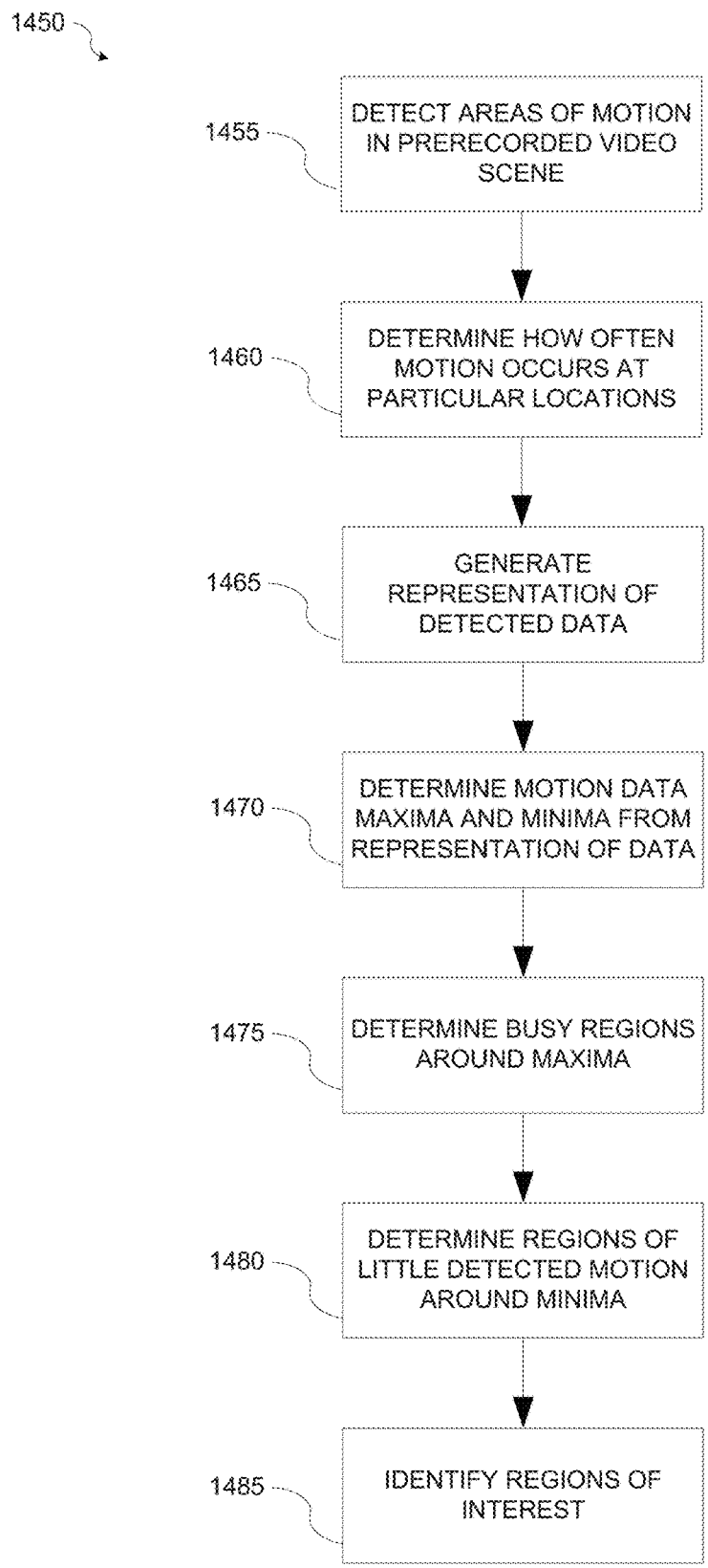
FIG. 4C is a flowchart of a method for performing a motion analysis of a video in accordance with various aspects of the present disclosure.

Referring again to FIG. 4A, at block 430 the video may be analyzed for motion. FIG. 4C is a flowchart of a method 1450 for analyzing the video for motion (i.e., performing a motion analysis) in accordance various aspects of the present disclosure. Referring to FIG. 4C, at block 1455 the computer 120 may analyze the video using a motion detection algorithm to identify motion in the scene. For example, the computer 120 may run a motion detection algorithm. The motion detection algorithm may detect motion in various areas of the scene as the motion occurs throughout the video. The video may be prerecorded or may be captured in real time. One of ordinary skill in the art will appreciate that other characteristics, for example but not limited to heat from an infrared signature, sound from an audio recording corresponding to the video, etc., may be analyzed and processed in accordance with various aspects of the present disclosure without departing from the scope of the present disclosure.

At block 1460, the computer 120 may determine how often motion was detected at particular locations within the scene. For example, using the motion detection algorithm, the computer 120 may keep track of detected motion at various locations in the scene. At block 1465, the computer 120 may create a representation, for example but not limited to a heat map, of the detected motion data corresponding to particular locations. At block 1470, based on the representation of the detected motion data, the computer 120 may determine a maxima and a minima for the detected motion data. At block 1475, the computer 120 may determine busy regions, i.e., regions of high detected motion around the maxima that may be identified as zones of interest to a user.

At block 1480, the computer 120 may determine regions with little detected motion around the minima that may be identified as zones of interest to a user. Thresholds for the detected motion data may be defined to determine the regions of high detected motion around the maxima and the regions with little detected motion around the minima that may be identified as zones of interest. At block 1485, the regions of interest may be identified. The computer 120 may identify rectangular boundaries of each region of interest based substantially on the thresholds the detected motion data and may tag the identified regions of interest for identification. For example, referring to FIG. 3, the computer 120 may detect motion in an area of the room 200 including the doorway 315 and may tag this area of the scene as an area where motion is detected.

One of ordinary skill in the art will appreciate that more than one maxima and more than one minima and the associated ones of interest may be identified without departing from the scope of the present disclosure. Similarly, no maxima or no minima and their corresponding zones of interest may be identified without departing from the scope of the present disclosure.

In accordance with various aspects of the present disclosure, filtering may be applied to the motion analysis. Different types of motion (e.g., from different objects, for example, pets vs cars vs persons) in different types of detected static scenes may be intelligently filtered by the computer 120. The computer 120 may filter motion with respect to attributes that were measured when analyzing the video. Motion may be filtered based on motion starting or motion stopping, speed of motion, size of objects, motion of persons vs. cars vs. pets, detected motion that is inconsistent with the general detected motion, etc. For example, in a highway scene with lots of vehicle motion it may be of interest to spot a person walking. The detected motion of the person walking would be inconsistent with the general detected motion of vehicles on the highway.

Similarly, it may be of interest to identify pets and/or persons moving about a home, where the category of the moving object can contribute to the proposal of the zones and the rules to apply for the zone. Further, the computer 120 may use facial recognition to identify people. For example, the computer 120 may use facial recognition to compare known persons with persons entering a room and suggest an action "alert when an unknown person enters through this door." In addition, the computer 120 may use object recognition may be used to recognize that an object has been removed or added to a scene. For example, the computer 120 may use object recognition to identify a previously undelivered package placed in a room and suggest an action "notify when package delivered." Actions may be recommended based on any type of filtered scene measurements. One of ordinary skill in the art will appreciate that this is not an exhaustive list and that filtering may be based on many other types attributes without departing from the scope of the present disclosure. Depending on the filter applied, a different significance may be imparted to the corresponding zone.

While in the above method description static scene analysis is described as being performed before motion analysis, one of ordinary skill in the art will appreciate that static scene analysis and motion analysis may be performed in any order or performed concurrently without departing from the scope of the present disclosure.

Referring again to FIG. 4A, at block 440, the computer 120 may recommend the identified regions of interest to the user via the user interface 150 as zones to be monitored within the scene. A zone may correspond to a physical location within view of the video camera 110 and/or may correspond to a boundary within an image displayed on the display or the entire displayed image. Alternatively or additionally, a zone may be three-dimensional, i.e., may correspond to a volume within view of the video camera 110. When the zone corresponds to a volume, a stereoscopic imaging device may be used for determining depth information.

The computer 120 may verify that the recommended zones are consistent with the scene based on the results of the static analysis of the one or more still images and the motion analysis of the video. For example, the computer 120 may analyze the area and/or aspect ratio of the recommended zone, whether the recommended zone is in an upper or lower part of the image, and the entire scene as well as the cropped zone region of the recommended zone to ensure consistency with the scene.

Figure 5:
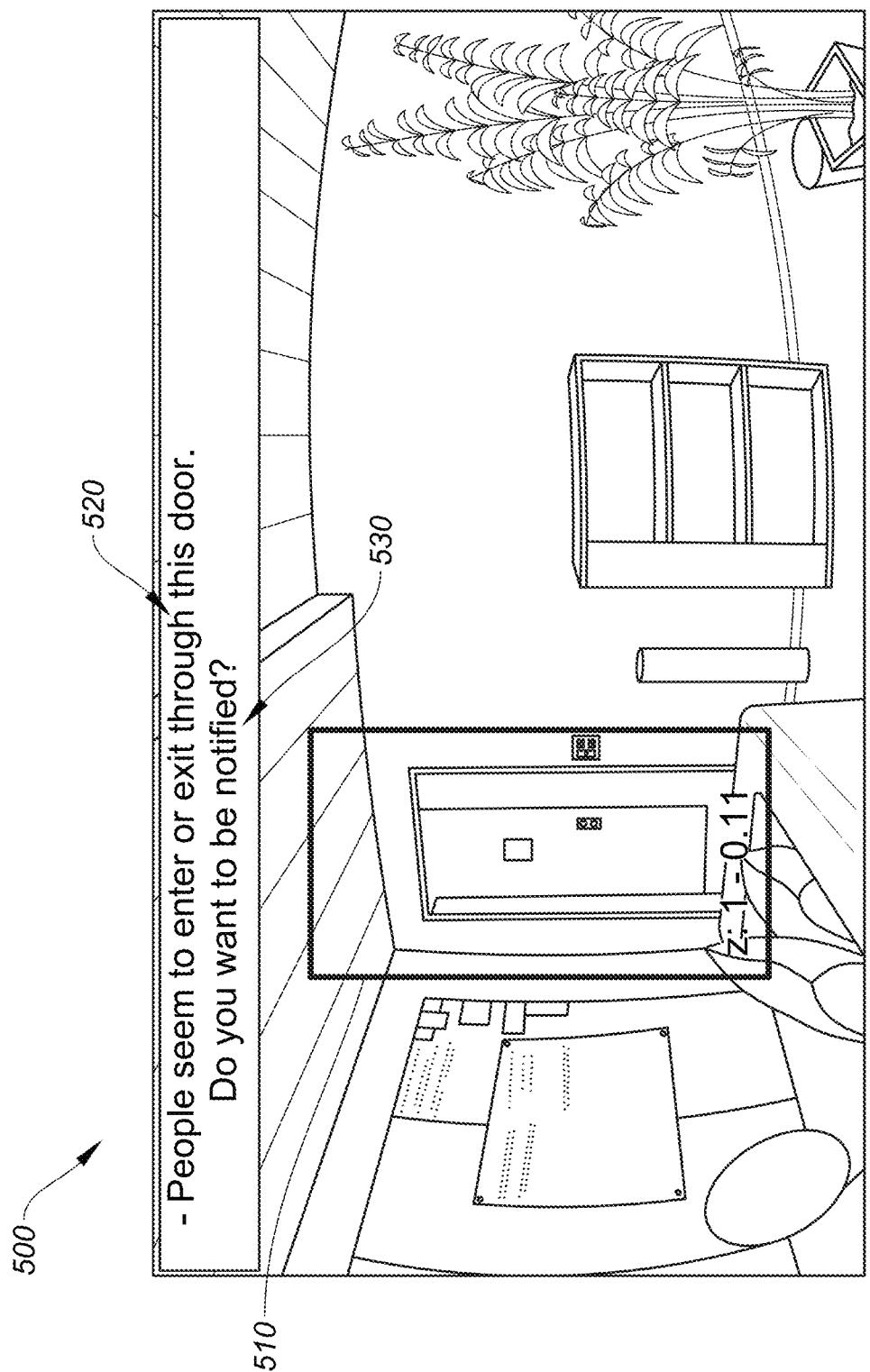
FIG. 5 is an illustration of a scene with a graphical representation of a recommended zone in accordance with various aspects of the present disclosure.

As an example, FIG. 5 is an illustration of a scene 500 with a graphical representation of a recommended zone 510 in accordance with various aspects of the present disclosure. Referring to FIG. 5, the computer 120 may cause the user interface 150 to present graphical representation of one or more recommended zones 510 in the scene 500 on the user display device 130. For example, based on the static analysis the computer 120 may determine that the scene is a room that includes a doorway. The computer 120 may determine from the results of the motion analysis that motion starts and/or stops in the area of the doorway and that the motion is caused by people.

At block 450, the computer 120 may provide an interest recommendation. By correlating the results of the motion analysis with the results of the static analysis, the computer 120 may infer what the motion is and where it occurs with respect to objects in the scene. The computer 120 may evaluate the labels and confidence values assigned to static objects within a recommended zone to determine features of the zone as well as the level of motion detected in the recommended zone and the time stamp indicating when the motion was detected. For example, by correlating the results of the motion analysis that determine a recommended zone of interest in which motion starts and/or stops with the results of the static analysis that determine the features of the scene associated with the area of the scene contained within that zone include a doorway, the computer 120 may infer that people enter or exit through the doorway. The computer 120 may use the scene analysis tool to segment objects within the scene, i.e., provide the spatial extents of the objects. For example, when a door or a couch is detected in a scene, the extent (i.e., bounding box) of the door or couch may be determined. The computer 120 may measure the overlap between detected frequent motion and the door or couch. The computer 120 may construct an interest recommendation 520 as to why the zone 510 may be of interest to the user (e.g., "people seem to enter or exit through this door" or "'your pet moves frequently on your couch") and cause the interest recommendation 520 to be displayed in the user interface 150 on the display device 130.

Figure 6:
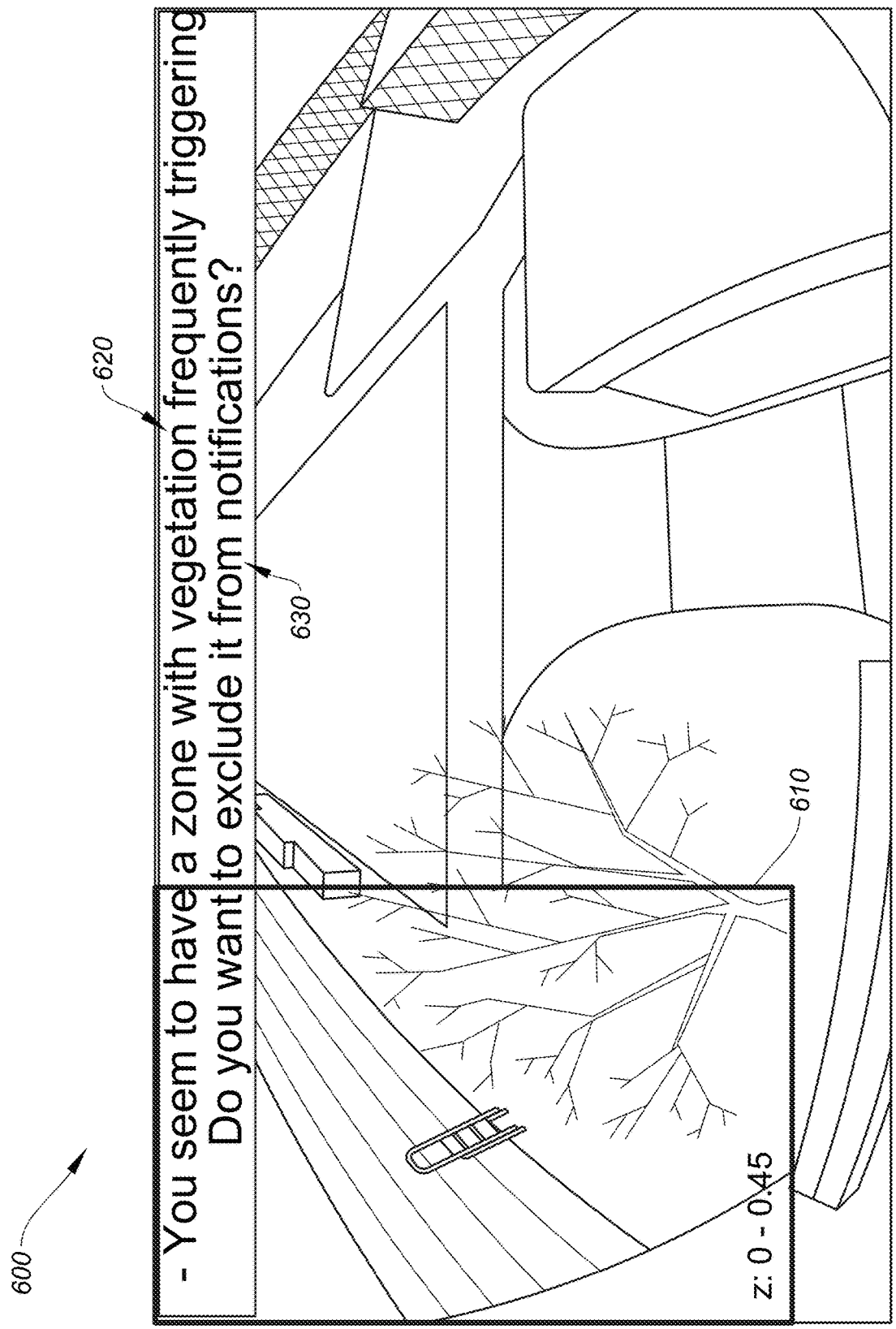
FIG. 6 is an illustration of an outdoor scene including a recommended zone in accordance with various aspects of the present disclosure.

As another example, FIG. 6 is an illustration of an outdoor scene 600 including a recommended zone 610 in accordance with various aspects of the present disclosure. Referring to FIG. 6, by correlating the results of the motion analysis that determine a recommended zone of interest in which frequent motion occurs with the results of the static analysis that determine the features of the scene associated with the area of the scene contained within that zone include plants, the computer 120 may infer that movement of the plants, for example caused by a breeze, results in frequent detection of motion. The computer 120 may construct an interest recommendation 620 as to why the zone 610 may be of interest to the user (e.g., "you seem to have a zone with vegetation frequently triggering motion detection.") and cause the interest recommendation 610 to be displayed in the user interface 150 on the display device 130.

Returning to FIG. 4A, at block 460, the computer 120 may generate various rules for the zone and cause the various rules to be recommended. For example, a rule may be recommended such that when and event is detected, for example, but not limited to, an object enters a zone, an alert is sent to the user. The alert may be, for example but not limited to, siren, bell, phone-call, etc. The rule may be generated based on object recognition and/or contextual information (e.g., time of day, location, weather, etc.) and/or crowd-sourced information (e.g., traffic, events, etc.), as well as historical values collected over time and analyzed to determine a pattern of events that occur in a zone.

At block 470, the computer 120 may recommend actions to be taken in each of the recommended zones in response to the rules for the zone. The rules may include prerequisites for an action to be taken in response to the rule. The action may be recommended to a user or the user may select an action, for example but not limited to, from a list of actions generated by the computer 120 and displayed on the user interface 150. Actions that may be taken may be, for example but not limited to, generating a specific alert, opening a gate, turning on lights, turning on a Roomba or other appliance, sending out a drone, etc. One of ordinary skill in the art will appreciate that the listed actions are merely exemplary and that other actions may be taken in response to various rules without departing from the stop of the present disclosure. Rules and/or actions may overlap in various combinations.

By correlating the results of the motion analysis with the results of the static analysis, the computer 120 may infer what action should be taken in response to a level of detected motion in the recommended zone 510 and construct an action recommendation. The computer 120 may evaluate the labels and confidence values assigned to static objects within a recommended zone to determine features of the zone as well as the level of motion detected in the recommended zone and the time stamp indicating when the motion was detected.

Referring again to FIG. 5, the computer 120 may construct a recommendation 530 (e.g., "want to be notified?") as to what action should be taken in response to a level of detected motion in a recommended zone 510 and cause the action recommendation 530 to be displayed in the user interface 150 on the display device 130. For example, in response to the above interest recommendations "people seem to enter or exit through this door" and "'your pet moves frequently on your couch," the computer 120 may construct action recommendations "want to be notified?" and "want to exclude this from notifications?"

Referring again to FIG. 6, as another example the computer 120 may construct a recommendation 630 as to what action should be taken in response to a level of detected motion in a recommended zone 610 and cause the action recommendation 630 (e.g., "want to exclude it from notifications?") to be displayed in the user interface 150 on the display device 130.

One of ordinary skill in the art will appreciate that other types of actions may be recommended based on the motion detection, level of motion detected, and/or lack of detected motion without departing from the scope of the present disclosure.

Returning to FIG. 4A, at block 480, the user may modify the recommended zones and/or actions. By interacting with the user interface 150, a user may resize, reposition, or delete the graphical representation of a recommended zone. One of ordinary skill in the art will appreciate that any applicable technique known in the art appropriate for interacting with the user interface 150 to resize, reposition, delete, or otherwise modify the graphical representation of a recommended zone may be used without departing from the scope of the present disclosure.

Additionally, a user may modify the recommended action. For example, the computer 120 may recommend that the user be notified of motion in a recommended zone. The user may elect to ignore motion in the recommended zone or be notified that no motion is occurring in the recommended zone. Modifications to the recommended zones and/or actions may be fed back as input for future static analysis and motion analysis. The user feedback may be incorporated in the analyses to improve recommendations of zones and actions made by the computer 120.

At block 490, the computer 120 may implement the zones and corresponding actions. The computer 120 may monitor via the video camera 110 the recommended zones including any modifications specified by the user and provide notifications as recommended or modified by the user.

In accordance with various aspects of the present disclosure, the video camera system 100 may identify a static object, for example but not limited to a television, in a recommended zone and provide a recommendation to the user that a notification be generated if the static object (e.g., the television) no longer appears in the zone. In combination with motion analysis, it may be possible to determine whether an unauthorized person removed the static object. The video camera system 100 may recommend a detection mechanism in which every motion is detected, or motion is only detected if a static object is removed/changed/added.

In accordance with various aspects of the present disclosure, a user may specify via the user interface 150 that a level of motion in a specific recommended or user-modified zone or in all monitored zones be tagged, with or without generating notifications, for subsequent viewing. The user may then retroactively search, via the user interface 150, the recorded video for motion detected in specific zones, a specified level of motion in all zones, etc. One of ordinary skill in the art will appreciate that other combinations may be tagged and searched without departing from the scope of the present disclosure.

In accordance with various aspects of the present disclosure, zones (i.e., recommended zones and/or user modified zones) may overlap. Referring again to FIG. 3, the third zone 330 may overlap the first zone 310. With overlapped zones, more complex notifications may be recommended by the video camera system 100 or defined by the user. For example, a notification may be generated when motion is detected in the first zone 310 by a person entering or passing by the doorway 315. A notification may also be generated by motion detected at the cabinet 325 in the third zone 330. With the first and third zones overlapped a combined notification may be generated when motion is detected in the first zone 310 and motion continues to the third zone 330 (e.g., a person enters the room through the doorway (as opposed to entering from the right-hand side of the room) and goes to the cabinet).

One of ordinary skill in the art will appreciate that various combinations of overlapped zones and notifications may be made without departing from the scope of the present disclosure.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for determining and recommending video content activity regions of a scene in a recorded video, the system comprising:

a video camera;
a display device configured to display a user interface;
a computer coupled with the video camera and the display device, the computer configured to:
   extract an image of a scene from a video;
   perform static analysis of the extracted image;
   detect motion in the scene based on motion detection signals received from one or more devices configured to detect motion;
   perform motion analysis on the video and the motion detection signals; and
   based on results of the static analysis and the motion analysis, recommend via the user interface a zone of interest within the scene,
wherein the motion analysis includes:
determining a maximum detected motion level in a region;
identifying regions around the region containing the maximum detected motion level that have detected motion levels equal to or greater than a specified detected motion level threshold lower than the maximum detected motion level; and
determining a region of interest as a region combining the maximum detected motion level and the identified regions having detected motion levels equal to or greater than the specified detected motion level threshold.

2. The system of claim 1, wherein the computer is configured to correlate the motion detection signals with motion analysis of the video, and
based at least in part on the correlation determine a location of movement.

3. The system of claim 1, wherein the computer is configured to generate an interest recommendation indicating a reason that a recommended zone is of interest based on results of the static analysis and the motion analysis.

4. The system of claim 3, wherein the computer is configured to
modify the interest recommendation based on input to the user interface, and
cause the modified interest recommendation to be considered in future static analysis and motion analysis.

5. The system of claim 1, wherein the computer is configured to generate an action recommendation indicating an action to be taken for a recommended zone of interest based on results of the static analysis and the motion analysis.

6. The system of claim 5, wherein the computer is configured to:
modify the action recommendation based on input to the user interface, and
cause the modified action recommendation to be considered in future static analysis and motion analysis.

7. The system of claim 1, wherein the computer is configured to determine that a recommended zone of interest has a high level of detected motion compared to a specified detected motion threshold.

8. The system of claim 7, wherein the computer is configured to generate an action recommendation to not provide notification of motion in the recommended zone when motion analysis results indicate that the recommended zone of interest has a high level of detected motion and static analysis results indicate that the motion is caused by a static object.

9. The system of claim 7, wherein the computer is configured to generate an action recommendation to provide notification of motion when motion analysis results indicate that a recommended zone of interest has a high level of detected motion and static analysis results indicate that the motion is caused by a person.

10. The system of claim 1, wherein the static analysis performed by the computer includes:
performing video recognition of static objects in the extracted image;
labeling recognized static objects with tags; and
assigning confidence level values to the tags indicating a degree of confidence in recognition of the static objects.

11. The system of claim 1, wherein the motion analysis performed by the computer includes:
determining a minimum detected motion level in a region;
identifying regions around the region containing the minimum detected motion level that have detected motion levels equal to or less than a specified minimum detected motion level threshold greater than the minimum detected motion level threshold; and
determining a region of interest as a region combining the maximum detected motion level and the identified regions having detected motion levels equal to or greater than the specified detected motion level threshold.

12. The system of claim 1, wherein the motion analysis performed by the computer includes:
filtering the results of the motion analysis based on a scene measurement; and
recommending an action based on the filtered results of the motion analysis.

13. The system of claim 12, wherein the scene measurement comprises at least one of facial recognition and object recognition.

14. The system of claim 12, wherein the scene measurement comprises detecting motion inconsistent with general motion detected in the zone.

15. The system of claim 1, wherein the computer is configured to generate a rule for the zone of interest specifying an action to be taken when an event occurs, and cause the rule to be recommended via the user interface.

16. A method for determining and recommending video content activity regions of a scene in a recorded video, the method comprising:
extracting an image of a scene from a video;
performing static analysis of the extracted image;
detecting motion in the scene based on motion detection signals received from one or more devices configured for non-visual motion detection;
performing motion analysis on the video and the motion detection signals; and
based on results of the static analysis and the motion analysis, recommending via a user interface displayed on a display device a zone of interest within the scene.

17. The method of claim 16, further comprising correlating the motion detection signals with motion analysis of the video, and
based at least in part on the correlation determining a location of movement.

18. The method of claim 16, further comprising generating an interest recommendation indicating a reason that a recommended zone is of interest based on results of the static analysis and the motion analysis.

19. The method of claim 18, further comprising:
modifying the interest recommendation based on input to the user interface, and
causing the modified interest recommendation to be considered in future static analysis and motion analysis.

20. The method of claim 16, further comprising: generating an action recommendation indicating an action to be taken for a recommended zone of interest based on results of the static analysis and the motion analysis.

21. The method of claim 20, further comprising:
modifying the action recommendation based on input to the user interface; and
causing the modified action recommendation to be considered in future static analysis and motion analysis.

22. The method of claim 16, further comprising determining a recommended zone of interest has a high level of detected motion compared to a specified detected motion threshold.

23. The method of claim 22, further comprising generating an action recommendation to not provide notification of motion in the recommended zone when motion analysis results indicate that the recommended zone of interest has a high level of detected motion and static analysis results indicate that the motion is caused by a static object.

24. The method of claim 22, further comprising generating an action recommendation to provide notification of motion when motion analysis results indicate that a recommended zone of interest has a high level of detected motion and static analysis results indicate that the motion is caused by a person.

25. The method of claim 16, wherein the performing the static analysis includes:
performing video recognition of static objects in the extracted image;
labeling recognized static objects with tags; and
assigning confidence level values to the tags indicating a degree of confidence in recognition of the static objects.

26. The method of claim 16, wherein the performing the motion analysis includes:
determining a maximum detected motion level in a region;
identifying regions around the region containing the maximum detected motion level that have detected motion levels equal to or greater than a specified detected motion level threshold lower than the maximum detected motion level; and
determining a region of interest as a region combining the maximum detected motion level and the identified regions having detected motion levels equal to or greater than the specified detected motion level threshold.

27. The method of claim 16, wherein the performing the motion analysis includes:
determining a minimum detected motion level in a region;
identifying regions around the region containing the minimum detected motion level that have detected motion levels equal to or less than a specified minimum detected motion level threshold greater than the minimum detected motion level threshold; and
determining a region of interest as a region combining the maximum detected motion level and the identified regions having detected motion levels equal to or greater than the specified detected motion level threshold.

28. The method of claim 16, wherein the performing the motion analysis includes:
filtering the results of the motion analysis based on a scene measurement; and
recommending an action based on the filtered results of the motion analysis.

29. The method of claim 28, wherein the scene measurement comprises at least one of facial recognition and object recognition.

30. The method of claim 28, wherein the scene measurement comprises detection of motion inconsistent with general motion detected in the zone.

31. The method of claim 16, further comprising generating a rule for the zone of interest specifying an action to be taken when an event occurs, and causing the rule to be recommended via the user interface.

* * * * *